Feb. 9, 1932. V. ALTEN 1,844,140
TRAILER COUPLING FOR TRACTOR VEHICLES
Filed Jan. 10, 1930
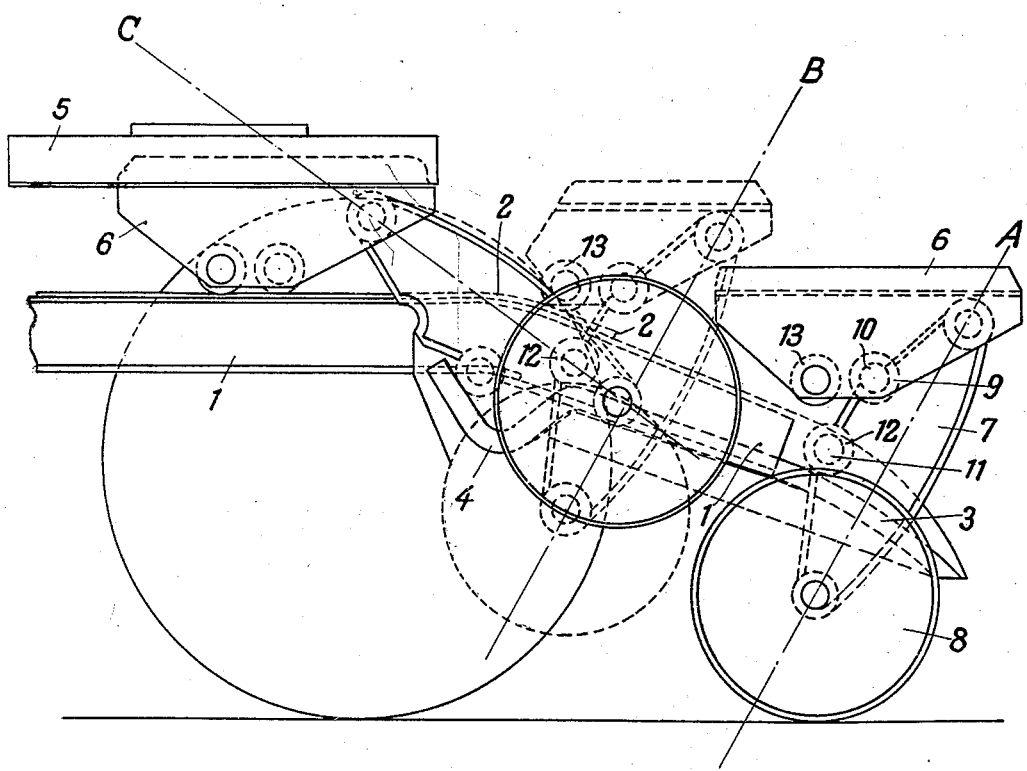
Inventor:
Victor Alten Patented Feb. 9, 1932

1,844,140

UNITED STATES PATENT OFFICE

VICTOR ALTEN, OF BERLIN, GERMANY

TRAILER COUPLING FOR TRACTOR VEHICLES

Application filed January 10, 1930, Serial No. 419,899, and in Germany January 16, 1929.

In automatic couplings in which by a reverse motion of the engine the trailer is caused to ride on the rear part of the tractor, simultaneously swinging the trailer's support or landing wheels backwards and upwards, it has been proposed to arrange the rear end of a guide path, provided to swing the said landing wheels into position, parallel or approximately parallel to the wedge portion of the support rails. This motion is effected by means of rollers fixed to the arms carrying the landing wheels, said rollers first engaging the rectilinear and subsequently the curved part of said guide path. This construction is the subject of applicant's copending application Serial No. 230,207, filed October 31, 1927.

This arrangement does not give entire satisfaction, considering that both, the support and the guide rollers can only retain the respective positions assigned to them in this motion as long as the vehicles move on a perfectly flat surface. Supposing the surface on which the vehicles stand to be locally uneven, being partly raised or depressed, the angle of inclination of the front part of the trailer carrying the rollers will be subject to variations of amplitude, this causing the distance between the lines of engagement with their guiding and supporting paths to become variable as well and either to become too long or to be unduly shortened. When the distance between the carrying and the guiding rollers exceeds a certain limit, a correct operation of the mechanism could not be obtained. Should too much play be left between rollers and path the guiding members would cease to hold the rollers in position and the rocking front wheels would be prematurely swung backwards. Contrariwise the said distance becoming unduly shortened the weight of the load would be transferred from the support rails to the guide members which are not designed for such strains and the support rollers would thereby be lifted off their track.

The present invention relates to a new automatic semi-trailer coupling which overcomes the above difficulties by obliging the rollers to remain in their respective positions and to follow parallel paths during the first part of the lifting motion.

This is obtained by making the rocking arms on the semi-trailer bogie lift and carry the weight of the vehicle during the first phase of the motion by means of rollers engaging inclined support and guide paths, said weight being latterly transferred to a pair of support rails shortly before the rocking arms have to be unweighted so as to be released in view of being swung backwards into position.

The invention is illustrated diagrammatically in the accompanying drawing by a side view of the off side of the rear part of the tractor and shows the different phases of the coupling motion in positions A, B and C.

The rear ends of downwardly inclined frame members I carry support rails 2 and at a lower level guide and support members 3 to which are forwardly fixed sickle-shaped guide members 4.

The semitrailer bogie mounted on frame members 5 bears support brackets 6 to which are hinged arms 7 on pins 15, the lower ends of said arms carrying an axle on which run landing wheels 8. The landing wheel arms 7 have semicircular bearing surfaces 9 which in positions A—B engage pins 10 arranged on brackets 6. The said arms are connected by a second axle II on whose off-ends revolve rollers 12. The brackets 6 carry short shafts 14 on which run supporting rollers 13.

Position A shows the semi-trailer bogie when resting on the ground before lifting. When the tractor is reversed the rollers 12 first engage the wedge shaped support and guide members 3 which cause the trailer to be lifted from the ground. This motion is continued from position A to B in which latter position the rollers 13 engage the rails 2 said rollers henceforward taking up the load of the trailer. As from here onward the curve of members 4 slopes downwards, the rollers 12, following this path, the rocking arms 7 are first caused to fall into perpendicular position finally to be swung backwards by the ascending branch of curve member 4 whilst the rollers 13 advance further on the rails 2 to the coupling position C in which the tractor and semi-trailer are connected by hooks (not shown in the drawing) engaging the ends of shafts or by other usual means.

Finally the bogie having attained its terminal position on the rear part of the tractor both vehicles are connected by hooks or other usual means.

When uncoupling the vehicles the operation takes place in the reversed order.

I wish it to be understood that the constructional form of the coupling as shown and described may be modified without departing from the invention, the scope of which is defined in the claim. The rollers 13 may for instance be replaced by a rocking member having two rollers.

Having now particularly described and ascertained the nature of my said invention and in what manner the same is to be performed, I declare that what I claim is:—

1. A semi-trailer coupling, comprising, in combination with a tractor and its semi-trailer, an upper pair of rearwardly inclined trailer supporting members provided at the rear part of the tractor; supporting rolls provided on the semi-trailer in a position in which they are adapted to be engaged, lifted and supported by said inclined members of the tractor; arms hinged to the semi-trailer and landing wheels attached to the free ends of said arms; guide rolls attached to said arms, intended to be lifted and to guide the front part of the semi-trailer; a lower pair of supporting and guiding members provided at the rear part of the trailer, the rear part of said members adapted to lift the semi-trailer during the first phase of the motion; forward sickle-shaped curved prolongations of said lower supporting members adapted to guide the guide rolls and the hinged arms, said arms being unweighted and free to turn rearwardly and upwardly shortly after the weight of the trailer has been transferred from said guide rolls to said supporting rolls when the latter engage their upper supporting members, substantially as set forth.

2. A semi-trailer coupling, comprising, in combination with a tractor and its semi-trailer, an upper pair of rearwardly inclined trailer supporting members, supporting rollers on the semi-trailer adapted to engage said members when lifted off the ground, a lower pair of inclined supporting members extending rearwardly beyond said upper members, rearwardly swingable arms hinged to the trailer and having ground engaging wheels at the free ends thereof, guide rollers journaled on said arms and engageable with said lower supporting members to guide and support the weight of the trailer in its lifting movement on the tractor, depressed portions at the upper front ends of said lower members disposed adjacent the ends of said upper members to receive said guide rollers, whereby the weight of said trailer is transferred from said lower supporting members to said upper members and suporting rollers.

In testimony whereof I have affixed my signature.

VICTOR ALTEN.